G. FARMER.
Reaper.
No. 29,685. Patented Aug. 21, 1860.
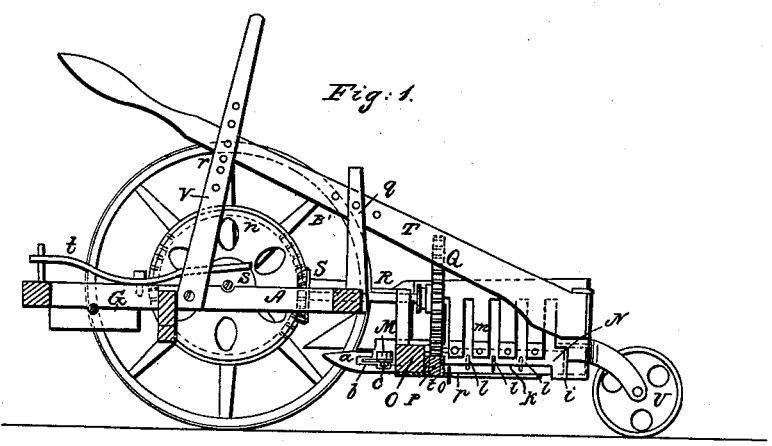
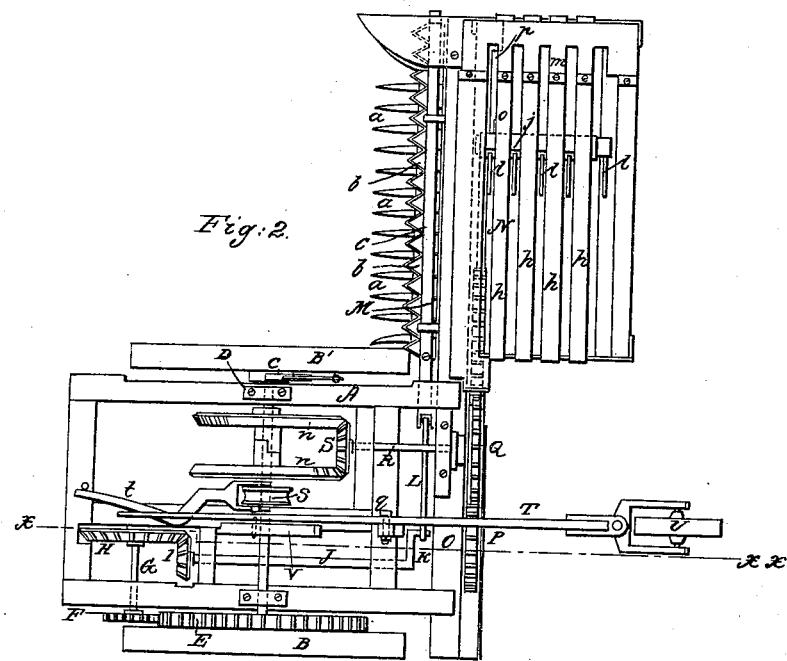
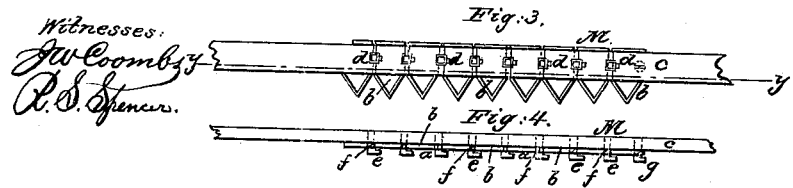

UNITED STATES PATENT OFFICE.

GEORGE FARMER, OF OSCEOLA, ILLINOIS.

IMPROVEMENT IN HARVESTERS.

Specification forming part of Letters Patent No. 29,685, dated August 21, 1860.

*To all whom it may concern:*

Be it known that I, GEORGE FARMER, of Osceola, in the county of Stark and State of Illinois, have invented a new and Improved Reaper or Harvester; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a plan or top view of the same; Fig. 3, a detached plan of the sickle; Fig. 4, a front sectional view of the same, taken in the line $y\ y$, Fig. 3.

Similar letters of reference indicate corresponding parts in the several figures.

To enable those skilled in the art to fully understand and construct my invention, I will proceed to describe it.

A represents the main frame of the machine, which is of rectangular form and supported by two wheels, B B′, one of which, B, is permanently secured to its axle and the other, B′, fitted loosely upon it. The wheel B′, however, has a pawl, C, attached to it, which pawl may be made to engage, when necessary, with a ratchet, D, on the axle and connect wheel B′ with the axle, so that the former may serve as a driver and assist B when required.

To the inner side of the wheel B a toothed rim, E, is attached, into which a pinion, F, gears. The pinion F is placed on one end of a shaft, G, at the front part of the main frame A, and on the inner part of shaft G a bevel-wheel, H, is placed, the latter gearing into a pinion, I, on the front end of a shaft, J, which is placed longitudinally in the main frame A, and has a crank, K, at its back end. To this crank a pitman, L, is attached, the latter being connected to the sickle M, which runs on fingers $a$, as usual, the fingers being attached to the front end of the platform N. The sickle M is formed of V-shaped teeth $b$, attached to a bar, $c$, as follows: A series of rivets, $d$, pass vertically through the bar $c$, and have their lower ends provided with a hook, $e$. Each tooth $a$ has its edges notched, as shown at $f$ in Fig. 3, and a rivet, $d$, passes down between the adjoining tooth and its hook $e$, projecting under the surface of one of them, which has a beveled edge to support the one adjoining, under which the hook $e$ aforesaid does not pass. It will be seen, therefore, by referring to Fig. 4, that each tooth $b$ is supported at one side by a hook, $e$, and at the opposite side by the bevel or overlap of the adjoining tooth. The outermost tooth, $b$, at one end of the sickle is secured at its outer edge by a screw, $g$, by removing which the teeth may be readily detached from their bar $c$. The back edges of the teeth $b$ are turned up at the back edge of the bar $c$. The platform N is attached rigidly to the back part of the main frame A by a bar, O, which is a continuation of the finger-bar. The inner end of the platform N is nearly in line with the inner side of the main frame, but back of it, so that the grain may be discharged directly behind the main frame. The bed of the platform is formed of bars $h$, placed at equal and suitable distances apart, as shown clearly in Fig. 2, and underneath the platform, at its front and back ends, there are ways $i$, on which the ends of a tubular bearing or support, $j$, rests, said bearing or support having a wooden cylinder, $k$, fitted in it, to which teeth $l$ are attached. The cylinder $k$ is the rake-head, and it is allowed to turn freely in its bearing, so that the teeth $l$ may project upward at the proper time between the bars $h$ of the platform. At the outer end of the platform an inclined grating, $m$, is placed, the use of which will be presently shown.

To one end of the bearing $j$ a rack-bar, P, is attached, said rack-bar resting on the front way, $i$, and having a wheel, Q, gearing into it. This wheel Q is placed on the back end of a shaft, R, the front end of which has a bevel-wheel, S, placed on it, and into which, at opposite sides, two bevel-wheels, $u\ u$, with cogged sections, alternately gear and give a reciprocating movement to the rack-bar P, and consequently to the rake. The rake-head $k$ has a pin, $o$, projecting down from its under side, and there is a projection, $p$, at the outer part of the front way, $i$. Each time the rake reaches the termination of its outward movement and passes through the grating $m$ the pin $o$ of the rake-head strikes the projection $p$, and the teeth $l$ are turned upward between the bars and rake the cut grain from the platform during their inward movement toward the main frame A, the grain falling directly behind the main frame. The teeth $l$ then fall by their own gravity below the bars. $h$, and the rake returns to the outer end of the platform to rake off, as before, the grain therefrom.

To the back part of the main frame A there is attached by a fulcrum-pin, $q$, a lever or bar, T, the back end of which has a caster-wheel, U, secured to it. The front end of this lever or bar may be retained at any desired height by a pin, $r$, which passes into a perforated bar, V, on the platform, the lever or bar T resting on the pin $r$. By adjusting this lever or bar T the sickle and platform may be raised or lowered, so that the grain may be cut at the desired height. The bevel-wheels $u$ $u$ are placed loosely on the axle and connected therewith, when desired, by a clutch, $s$, which is actuated by a lever, $t$. By attaching the platform N rigidly to the back part of the main frame the former is supported by the latter, and the supporting of the outer end of the platform by a grain wheel or shoe is avoided.

I do not claim the employment or use of the lever or bar T provided with the caster-wheel for regulating the height of the cut of the sickle, for that has been previously used; but I do claim as new and desire to secure by Letters Patent—

1. The arrangement, as herein shown and described, of the rack-bar P, driving-wheel Q, rake-head J, shaft R, pinion S, and section cog-wheels $n$ $n$, so that the section-wheels will rotate the shaft R first in one direction, then in the opposite, thus causing the rack-bar P to reciprocate and carry the rake, and also cause the latter to open and close, all as set forth.

2. The making of the cutters with their rear ends bent up to fit the back part or edge of the cutter-bar, and with their sides beveled and notched, as shown, when fastened by the hooked bolts or nuts $d$, in the manner herein shown and described, one edge of each cutter being held up by a hook, and the opposite edge being held up by the overlapping bevel of the edge of the adjoining cutter, all arranged as set forth.

GEORGE FARMER.

Witnesses:
CHARLES ROOD,
JOHN S. PASHLEY.